July 8, 1947. L. L. PIERCE 2,423,564
GANG SCRIBING MACHINE
Filed Aug. 4, 1943 2 Sheets-Sheet 2
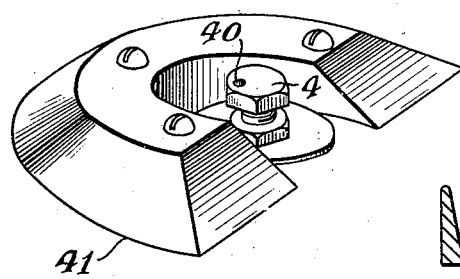
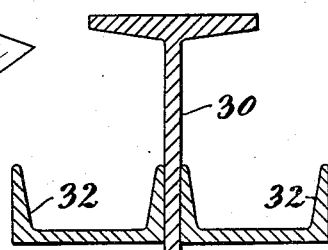
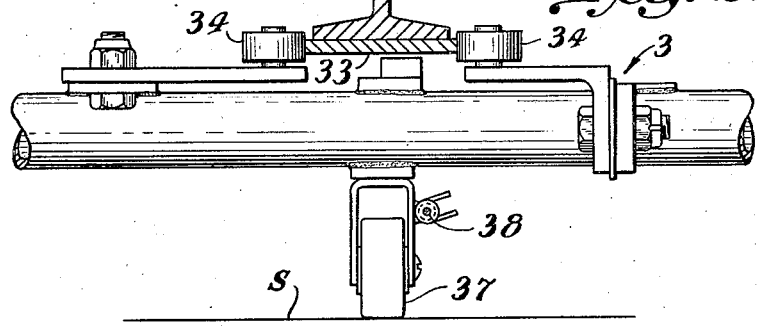
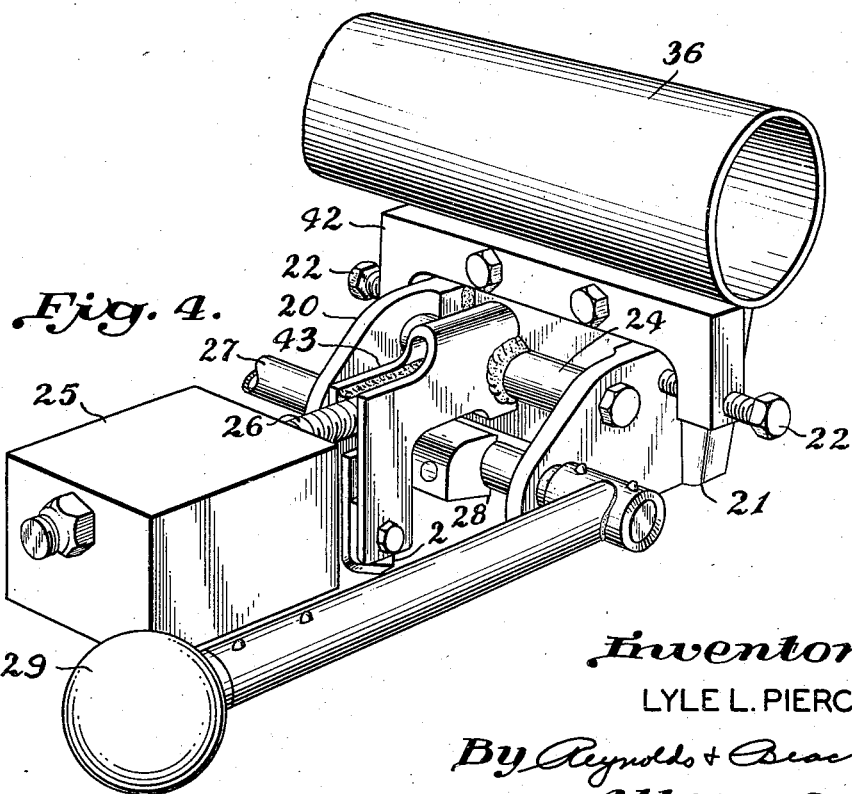
Inventor:
LYLE L. PIERCE
By Reynolds + Beach
Attorneys Patented July 8, 1947

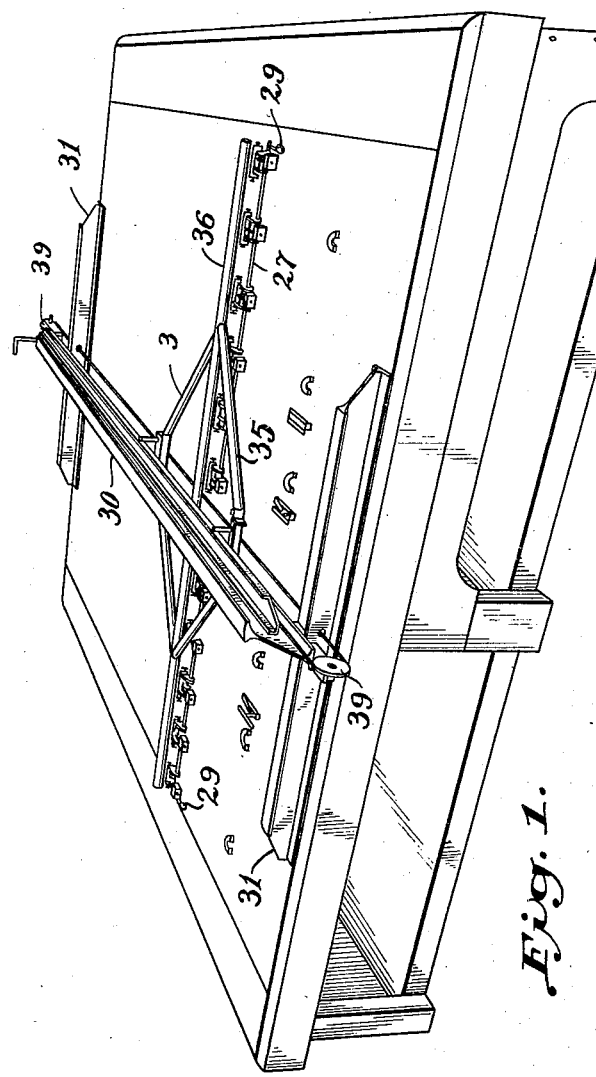
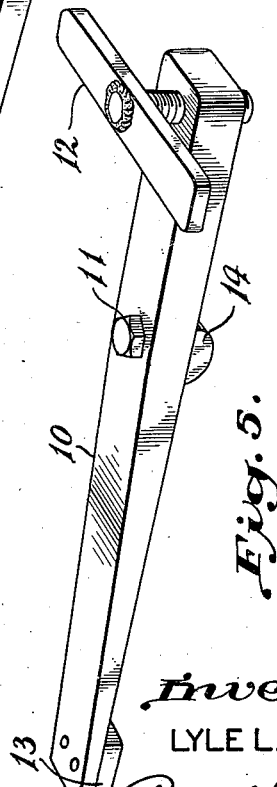
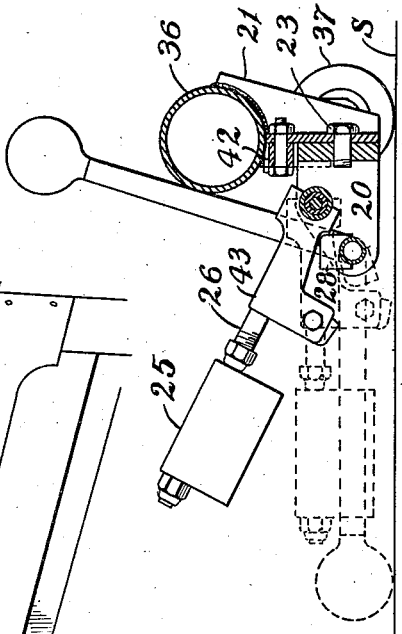

2,423,564

UNITED STATES PATENT OFFICE 2,423,564

GANG SCRIBING MACHINE

Lyle L. Pierce, Seattle, Wash., assignor to Boeing Aircraft Company, Seattle, Wash., a corporation of Washington Application August 4, 1943, Serial No. 497,309

7 Claims. (Cl. 33—32)

The scribing machine to which this invention relates is of the type used for marking large sheets or templates.

Current production of machinery and equipment, such as airplanes, for example, in many cases utilizes full-scale drawings of parts. These are customarily made on metal sheets, which may be as much as eight, ten or twelve feet along a side. To facilitate the layout of drawings on sheets of such size it has been found desirable to draw a series or set of parallel lines perpendicular to an edge of the sheet, spaced apart uniformly, and frequently two perpendicularly intersecting series of such lines to form a reference grid.

Modern production requires that parts be precisely interchangeable, and that joining parts fit together accurately. One of the principal reasons for drawing the parts to full scale, despite their size, is to increase the accuracy of their shapes. Since such a grid or parallel line structure is used as a reference for drawing the configuration of a part it is axiomatic that it must be extremely accurate if the configuration of the part is to be of the proper shape and dimensions. It is essential, therefore, that the lines of such grid be absolutely straight, parallel and accurately spaced from end to end of the sheet. Moreover, where two intersecting series or sets of lines are drawn they must be precisely perpendicular to each other. To draw such lines individually in the conventional manner not only is tedious, but is of doubtful accuracy.

It is the principal object of my invention, therefore, to draw all the lines of a single set simultaneously, and by mechanism which is controlled accurately and automatically, to insure that all the lines will be straight, parallel and equally spaced.

A further object of my invention is to provide a gang scribing machine for drawing such a series of lines which can be manipulated quickly and with little effort on the part of the operator. Moreover, the parts of such machine are capable of minute adjustment to effect accurate spacing of the lines.

My machine is also of rugged construction, so that after the parts have been adjusted initially it will not be necessary to check or alter their positions frequently.

To insure the accuracy of operation of my machine it is an object to provide locating elements with reference to which a sheet to be lined can be placed, and clamps to anchor the sheet securely when its proper position has been established.

Still another object is to enable the marking elements to be regulated so that in moving over the sheet in one direction the weight of the lines drawn can be varied, even to the point of making certain lines heavier than others during movement of such elements in one direction across the sheet, and which elements can readily be removed from contact with the sheet during their return movement.

Additional advantages of my machine, which result from certain of its structural features, will be indicated in the following description. Various changes in structural details of the machine can, of course, be made while utilizing its principal features as defined in the appended claims.

Figure 1 is a top perspective view of my gang scribing machine, and Figure 2 is a vertical section through its central portion, while Figure 3 is an end elevation view of such portion of the machine taken perpendicular to Figure 2.

Figure 4 is a top perspective view of one of the marking elements and its supporting structure. Figure 5 is a top perspective view of a sheet clamp, and Figure 6 is a top perspective view of a sheet locating element.

The scribing machine is supported lengthwise of a large, perfectly flat, table 1, on which rest the sheets or template plates to be lined. Preparatory to scribing the lines on it the sheet is located and then is clamped firmly in place by clamp bars 10, which can be swung universally. A stud 11 secures the clamp bar to the table, but enables it to be swung freely about a vertical axis when the clamp screw handle 12 is loose. Several of these clamp bars 10, it will be noted in Figure 1, are spaced along at least one edge of the sheet S, and these bars have been swung to a position generally perpendicular to the sheet edge so that the pads 13 of gripping material overlie the sheet. By rotating the handle 12 of each clamp to screw down its clamping screw the end of the clamp bar or lever 10 is raised to tilt it about fulcrum block 14, so that pad 13 will be pressed firmly against the sheet to hold it firmly against edgewise movement. Stud 11 passes through an aperture in the clamping bar and fulcrum block 14 of sufficient size to enable such bar to rock freely on the fulcrum block to the extent necessary.

With the sheet thus clamped to the table 1 the scribing operation may be performed. The nature of the marking or scribing elements employed depends to some extent upon the type of surface on which the lines are to be drawn. Thus they may be graphite pencils, pens, scratching points or merely a marking edge. Conventionally a metal sheet having a white painted surface is employed for making full-sized layouts of various large parts, and lines may be made on this surface by a metal blade 2, as shown in Figure 4. The term "stylus" will be understood to designate any such marking element.

The several styluses are supported for conjoint movement by a carriage 3, which is guided for movement lengthwise of the table by a beam 30 supported well above the table on spacer sills 31. The entire upper surface of the table 10 is thus left free for convenient access in laying the heavy sheets on the table, yet the styluses are always located accurately with respect to the table. The cross section of beam 30 is important only to give it sufficient stiffness so that it can not be deflected, particularly in a direction parallel to the plane of the table. Such deflection of this beam would cause the scribed lines to be non-linear. To guard against such deflection, therefore, the beam proper may be of I-beam shape, and it may be stiffened principally parallel to the table by attaching channels 32 or equivalent shapes along each side of it. To the bottom of this beam is secured the guide plate 33 along which roll guide rollers 34 carried by the carriage 3.

It will be noted that the carriage itself preferably is not supported by the beam 30, but guide plate 33 on the beam merely serves as a track to control movement of the carriage lengthwise of the table 1. The carriage itself is a rigid, self-supporting structure composed of a trussed frame 35 of substantially rhombus shape underlying rail 30, opposite apexes of which, spaced a substantial distance lengthwise of beam 30, carry guide rollers 34. The crossbar 36, preferably a large tube which is structurally integral with the other opposite apexes of rhombus shaped trusswork 35, extending transversely of beam 30 and diagonally of frame 35, is disposed precisely perpendicular to the guiding edges of track 33. The individual marking element carriers 20 are mounted at intervals beneath this crossbar, and wheels 37 at spaced locations along its length support directly from the table 1 the entire weight of the carriage. The carriage may be traversed along track 33 by a return cable 38 fastened at one location to the carriage, and passing about pulleys 39 journaled on the opposite ends of beam 30. The lower stretch of the cable passes through apertures in sills 31.

The spacing of the stylus carriers 20 along tube 36 will coincide approximately with the desired spacing of the lines to be drawn on the template sheet. It is essential that the blade or stylus 2 mounted on each carrier, when once located, be held against shifting along the crossbar. It is preferred, therefore, that each carrier be mounted on a channel bracket 21 secured rigidly to the crossbar 36, such as by welding. These brackets thus attached to the tube may not be spaced precisely equidistantly along it. Consequently the immediate stylus carriers 20 should be adjustable lengthwise of the crossbar relative to the brackets 21 within limits. For this purpose locating screws 22 threaded in the opposite ends of yoke 42, bolted to its channel bracket, clamp the carrier 20. Bolts 23 passing through slots in the bracket base extending lengthwise of the crossbar 36 are threaded into the carrier 20 to support it. With these bolts slightly loosened locating screws 22 may be turned simultaneously through equal angles, one being screwed into and the other out of yoke 42, to shift the carrier lengthwise of crossbar 36 sufficiently to locate its stylus precisely in the desired relationship to the adjacent styluses. Tightening bolts 23 will hold the carrier in such position.

The stylus 2 is carried by the lower end of an angled arm 43 integral with a tube 24. This tube, extending transversely of such arm, fits between the side plates of the stylus carrier 20, and is journaled on a bolt interconnecting such side plates, to guide the arm for swinging about the bolt to raise and lower the stylus. The pressure exerted by the stylus upon the sheet S may be adjusted by moving a weight 25 toward or away from pivot tube 24 along a generally horizontal screw 26, which screw is integral with the angled arm 43. Thus screw 26 serves as a lever, tube 24 being the fulcrum. After the lines have been drawn on the sheet S it will be necessary to return the carriage to the end from which its movement was initiated, and during such movement it may be desired to lift the styluses 2 clear of the sheet or table 1. To lift a number of the styluses simultaneously a rod 27, interconnecting and journaled in several of the stylus carriers 20, and having eccentric blocks 28 secured on it, one beneath each angle arm 43, may be rotated by a handle 29. In the machine illustrated two such handles and rods are employed, one for all the styluses on each side of beam 30. Alternatively a single rod and handle might actuate all the styluses on both sides of the beam. When the handle is swung upward from the broken line position of Figure 3 or the solid line position of Figure 4 to the solid line position of Figure 3 each block 28 is rotated upward to engage its angle arm 43 and swing it with pivot tube 24. Each stylus 2 is thus raised well above the surface of the table, as shown in Figure 3. During the scribing operation the end of handle 29 may ride upon the table surface, or a stop to limit the downward movement of the handle may be provided, but in any event when the handle is lowered block 28 must move downward far enough to clear arm 43, so that engagement of stylus 2 with the table at all times is assured.

After the sheet or plate S has been clamped upon the table, handle 29 may be swung to lower all the styluses 2 into contact with the sheet. It is assumed that the adjusting screws 22 have been regulated so that all the styluses are spaced apart at precisely the correct intervals along crossbar 36. Also it is assumed that weights 25 have been adjusted along screw 26 toward or from tube 24 sufficiently so that the desired pressure is exerted upon each stylus 2. With the carriage 3 located to arrange all the styluses aligned along one edge of the sheet the carriage driving handle is rotated to turn its pulley 39 for traversing the carriage along beam 30. The guide rollers 34 engaging track 33 will guide crossbar 36 for true linear movement, and the spacing of the individual stylus carriers along the crossbar, positively maintained, will insure that the lines are drawn in precisely spaced and parallel relationship over the entire length of the sheet. When this series of lines has been drawn handles 29 may be swung upward to raise the styluses, after which the carriage may be returned to its initial position.

If it should be desired to complete a lined grid by drawing a second set of parallel lines intersecting the first set the sheet clamps 10 may be loosened and the sheet S swung through aproximately 90 degrees. At least two, and preferably a larger number of locating studs 4 are arranged along the edge of the sheet to be clamped. Each such stud has on its upper surface a reference point 40, preferably in the form of a conical depression in such surface. The reference points on the several locating studs define a straight line having a definite relationship, such as perpendicular, to the edges of track 33 and to the paths traced by the styluses 2.

The reference points 40 may be coordinated with a line of the first series drawn on sheet S by the use of trammel points, for example, to position the lines already scribed exactly parallel to the reference line defined by the several points 40. When the sheet is thus disposed clamp handles 12 may be rotated again to clamp the sheet in place with the clamping bars 10. By now traversing carriage 3 again along track 33 a second series of lines precisely perpendicular to the first series will be drawn to complete the grid. Clamps 10 then may again be released and the sheet removed from the machine.

It will be noted that the accuracy of the relationship of the two sets of parallel lines depends primarily upon the disposition of the sheet when the second set is drawn. Since the sheet is thus located entirely with reference to the line defined by the points 40 on locating studs 4 guard rails 41 may be secured around these studs to protect them from being disturbed. Such guard rails should project above the surface of table 1 slightly more than the studs 4, and each may encircle its stud completely. In any event the rails should protect the studs fully on the side toward the metal sheet so that it cannot inadvertently be moved edgewise to strike them.

What I claim as my invention is:

1. A gang scribing machine comprising a table, a guide rail disposed generally centrally of said table, and a carriage comprising a crossbar extending transversely of said guide rail, bracing means secured rigidly to said crossbar at locations spaced a substantial distance from opposite sides of said guide rail and extending a substantial distance beyond each side of said crossbar in the vicinity of said guide rail, guide means carried by each portion of said brace means remote from said crossbar and engaging said guide rail at locations spaced lengthwise thereof for guiding movement of said crossbar over said table lengthwise of said guide rail, means independent of said guide rail supporting said crossbar above said table, and a plurality of styluses carried by and spaced along said crossbar for engagement with a sheet on said table during movement of said crossbar lengthwise of said guide rail.

2. A gang scribing machine comprising a table, a guide rail disposed generally centrally of said table, and a carriage comprising a crossbar extending transversely of said guide rail, bracing means secured rigidly to said crossbar at locations spaced a substantial distance from opposite sides of said guide rail and extending a substantial distance beyond each side of said crossbar in the vicinity of said guide rail, guide means carried by each portion of said brace means remote from said crossbar and engaging said guide rail at locations spaced lengthwise thereof for guiding movement of said crossbar over said table lengthwise of said guide rail, members directly engaging and movable over said table including one located at each side of said crossbar and remote therefrom and supporting said brace means, and a plurality of said members spaced along and supporting said crossbar, and a plurality of styluses carried by and spaced along said crossbar for engagement with a sheet on said table during movement of said crossbar lengthwise of said guide rail.

3. A gang scribing machine, comprising a table, a guide rail, means supporting said guide rail spaced a substantial distance above and generally centrally of said table, and a carriage located beneath said guide rail including a rhombus shaped frame, a crossbar extending transversely of said guide rail disposed diagonally of said rhombus shaped frame and secured to opposite apexes thereof, guide rollers carried by the other opposite apexes of said rhombus shaped frame and engaging said guide rail for guiding movement of said cross bar over said table lengthwise of said guide rail, means for supporting said cross bar and said frame directly from said table, including a plurality of rollers spaced along said crossbar, and a roller carried by each apex of said rhombus shaped frame spaced from said crossbar, and a plurality of styluses carried by and spaced along said crossbar for engagement with a sheet on said table during movement of said crossbar lengthwise of said guide rail.

4. In a scribing machine, a table, a stylus, a T-shaped stylus support, including a generally horizontal element and an element projecting downwardly therefrom intermediate its ends and carrying said stylus, a carriage pivotally supporting one end of the horizontal element of said T-shaped support and guiding said support for movement over said table in a predetermined path, a weight carried by the other end of the generally horizontal element of said support and operable to press said stylus against said table during movement of said support thereover, and a lifting member disposed within the angle formed between the pivoted end of the generally horizontal element and the downwardly projecting element of said T-shaped support, and movable upward to engage such generally horizontal element of the support to swing it upward relative to said carriage for lifting said stylus well clear of said table in opposition to the force of said weight.

5. In a scribing machine, a table, a stylus, a stylus support including a generally horizontal element and an element projecting downward therefrom and carrying said stylus, a carriage pivotally supporting one end of the horizontal element of said stylus support and guiding said support for movement over said table in a predetermined path, a weight carried by said support and operable to press said stylus against said table during movement of said support thereover, and a lifting member disposed within the angle formed between the pivoted end of the generally horizontal element and the downwardly projecting element of said stylus support and movable upward to engage said generally horizontal element of the support to swing it upward relative to said carriage for lifting said stylus well clear of said table in opposition to the force of said weight.

6. A gang scribing machine comprising a table, a guide rail, means supporting said guide rail spaced a substantial distance above and generally centrally of said table, a crossbar located beneath and centrally engaged with said guide rail for movement over said table guided by such engagement, and extendng continuously transversely of said guide rail between locations at opposite sides of said guide rail and spaced substantial distances therefrom, means independent of said guide rail supporting said crossbar, and a plurality of styluses carried by and spaced along said crossbar for engagement with a sheet on said table during movement of said crossbar lengthwise of said guide rail.

7. A gang scribing machine, comprising a table, a guide rail, means supporting said guide rail spaced a substantial distance above and generally centrally of said table, and a carriage located beneath said guide rail and including a generally rhombus shaped frame, having opposite apexes disposed substantial distances beyond opposite sides of said guide rail, a crossbar extending transversely of said guide rail, projecting a considerable distance beyond opposite sides thereof, disposed diagonally of said rhombus shaped frame and secured to such opposite apexes thereof, guide rollers carried by the other opposite apexes of said rhombus shaped frame and engaging said guide rail for guiding movement of said crossbar over said table lengthwise of said guide rail, means for supporting said crossbar and said frame, and a plurality of styluses carried by and spaced along said crossbar for engagement with a sheet on said table during movement of said crossbar lengthwise of said guide rail.

LYLE L. PIERCE.

REFERENCES CITED

The following references are of record in the file of this patent:

UNITED STATES PATENTS

| Number | Name | Date |
|---|---|---|
| 728,417 | Sage | May 19, 1903 |
| 977,829 | Ourdan | Dec. 6, 1910 |
| 1,996,386 | Owen | Apr. 2, 1935 |
| 942,877 | Auerbach | Dec. 14, 1909 |